May 16, 1939.  K. P. TESKE  2,158,093

LIQUID MOLASSES STOCK FEEDER

Filed Jan. 2, 1937  2 Sheets-Sheet 1

K. P. TESKE  INVENTOR.

BY
Merrill M. Blackburn.
ATTORNEY

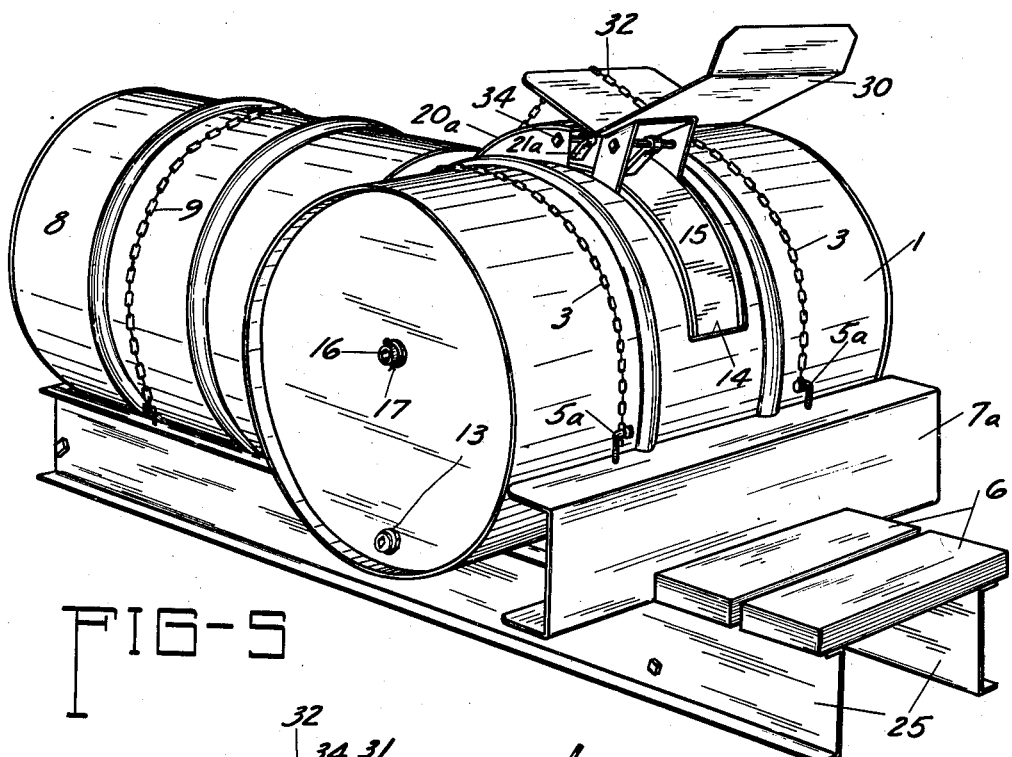
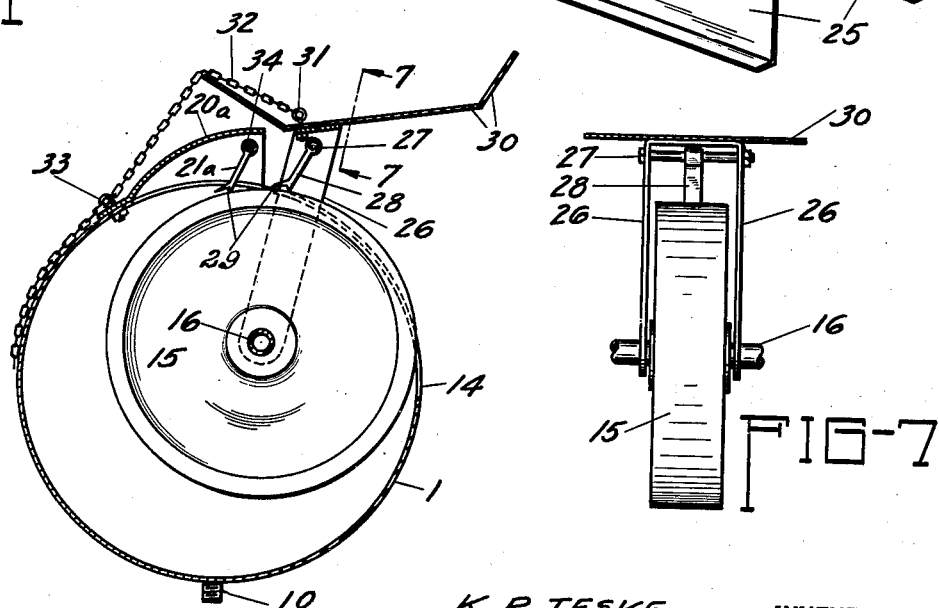

Patented May 16, 1939

2,158,093

UNITED STATES PATENT OFFICE 2,158,093

LIQUID MOLASSES STOCK FEEDER

Karl P. Teske, Davenport, Iowa

Application January 2, 1937, Serial No. 118,748

11 Claims. (Cl. 119—51)

The present invention relates to a stock feeder and more particularly to a feeder for feeding liquid molasses. Among the objects of this invention are the provision of a feeder such that the live stock, such as hogs, cattle, and sheep, for example, can be fed molasses without getting same into the nostrils; to provide a feeder of the nature indicated which can be readily transported from place to place; to provide a feeder of the character indicated which will expose to the live stock only a small part of the liquid at a time; to provide in a feeder of the nature indicated a guard by means of which a feeding wheel can be covered up if it is not desired to have it in operation; to provide a particularly efficient means for insuring that the feeding wheels will rotate in one direction only; to provide, in a feeder of the character indicated, feeding means which will have a minimum of resistance to the rotation of the feeding wheel; to provide, in a feeder of the character indicated, feeding means which is so constructed that the live stock will be certain to cause operation thereof; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 5 represents a perspective view of the preferred form of my construction;

Fig. 6 represents a transverse section through the feeding drum and illustrating more particularly the operating mechanism for the feeding wheel;

Fig. 7 represents the feeding wheel in front elevation, showing an actuating plate, in section, as if taken along the plane indicated by the line 7—7, Fig. 6.

Figure 1:
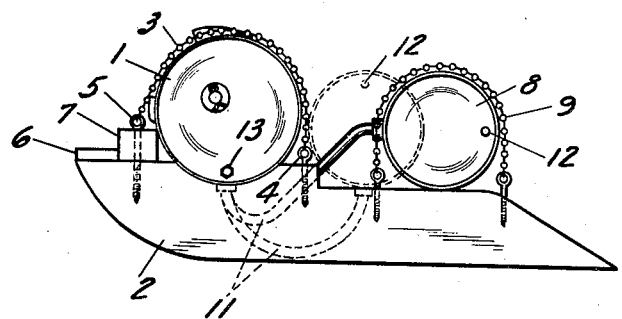
Fig. 1 represents a side elevation of one form of my new construction.

Reference will now be made in greater detail to the annexed drawings for a more complete disclosure of this invention. The feeding drum I rests on the sledge 2 and is held in place thereon by means of one or more chains 3 connected to eye-bolts 4 and 5. An anti-fouling board 6 is fastened to the forward ends of the runners of the sledge 2. This board also serves as a foot rest for pigs, enabling them to get their heads high enough up to get at the feeding rollers. A block 7 extends across the sledge and furnishes means against which the feeding drum I may rest.

A molasses supply barrel 8 is located on the rear portion of the sledge and is secured in place thereon by the chain 9 attached to eye-bolts, similar to bolts 4 and 5. The drum I is provided, intermediate its ends, with a nipple 10 to which is connected a hose 11, which is also connected to the supply barrel 8. If the connection to the supply barrel is intermediate the ends thereof, the barrel may be arranged either transversely or longitudinally of the sledge. However, if the hose is connected to the end of the barrel, then the latter should extend longitudinally of the sledge so that the hose 11 will not be subject to attack by live stock. In order to insure further against such attack, it is desirable to have boards extending transversely of the sledge, between the runners thereof, and extending down well toward the ground line at the front and rear ends of the sledge. The supply barrel is provided with a vent 12, normally closed by a removable plug which is capable of being removed to permit entry of air so that the molasses may run into the feeding drum.

A removable plug 13 in the end of the feeding drum makes it possible to drain out of the drum, at any time desired, the molasses which may be left therein. An opening or openings 14 in the curved wall of the drum are provided for the reception of the feeding wheel 15 rotatably mounted on the shaft 16 eccentrically positioned in the drum I. The shaft may be retained in the end walls of the drum by means of cotter-keys 17, nuts, or other equivalent means. The ends of the drum are held in place in any suitable manner as, for example, by brazing. The shaft 16 is mounted sufficiently loosely in the ends of the drum so that it may rotate with the feeding wheels 15, in event these should get stuck to the shaft and unable to turn independently thereof. As shown in Figs. 5 and 6, the shaft 16 may take the form of a pipe.

Figure 4:
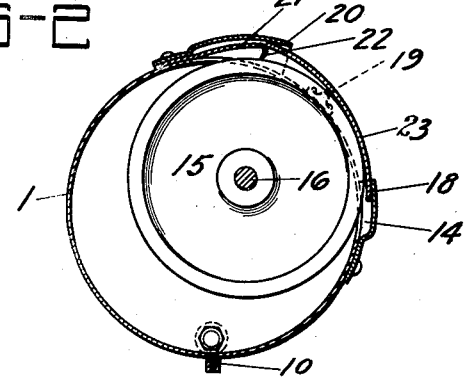
Fig. 4 represents a transverse section taken substantially along the plane indicated by the line 4—4, Fig. 2.

The feeding wheels 15 are made of a thickness such that they can be inserted through the openings 14 to be mounted on the shaft 16. The details of assembly are unimportant and will therefore not be recited. Caps 18 covering the lower portions of the openings 14 are connected in liquid-tight relation with the curved surface of the drum and therefore prevent leakage of the molasses through these openings, even though the molasses be high enough in the drum to enter the lower part of the openings 14. The caps 18 are far enough away from the wheels or rollers 15 so that molasses lifted thereby from the drum and tending to run back into the drum will be caught within these caps so as to be fed back into the drum. Guides 19, secured to the surface of the drum adjacent the openings 14, engage the edge portion of the rollers or wheels 15, as shown in Fig. 4, to prevent these feeding wheels from engaging the sides of the openings 14 and thus increasing the resistance to rotation of the wheels. These guides hold the wheels properly positioned with respect to the openings 14.

Caps 20 are secured to the top portion of the drum 1 and cover the upper portions of the openings 14, as shown most clearly in Fig. 4. Between these caps 20 and the upper surface of the drum are secured means 21 for preventing backward rotation of the rollers or wheels 15. These are preferably in the form of springs having an end bent downwardly and notched, as indicated at 22. These points are sharpened so that they engage the periphery of the wheel which may be made of wood or other suitable material, preferably non-metallic. Member 21 may be hingedly connected to the drum 1 and have its free end weighted to cause it to engage the edge of wheels 15 and prevent backward rotation thereof under the influence of the molasses clinging to it and brought up from the drum. Without something of this sort to prevent backward rotation of the wheel, the latter would tend to rotate backwardly and it would be difficult for the live stock to turn the wheel up until it would be possible to get at the molasses.

Figure 2:
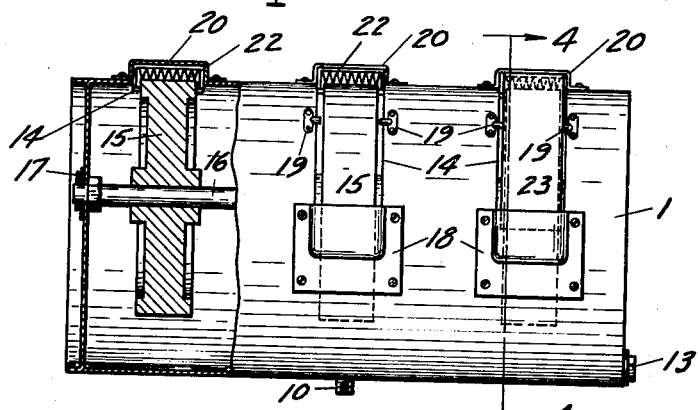
Fig. 2 represents a front elevation, partly broken away and in section, of the feeding drum.
Figure 3:
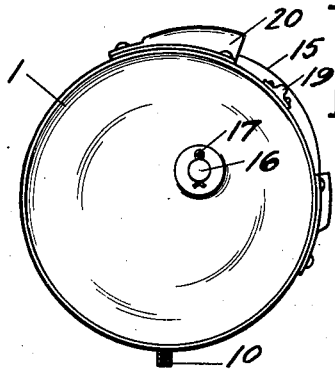
Fig. 3 represents an end elevation of the structure shown in Fig. 2, looking at the left hand end thereof.

There are times when it is desirable to keep the live stock away from the wheels 15 and, at such times, the edge of the wheel may be covered by inserting a plate 23 within the caps 18 and 20 and covering the periphery of the wheel 15, as shown in Fig. 4 and in the right hand portion of Fig. 2. For example, the wheels 15 may be placed just far enough apart so that sheep could stand side by side and use adjacent wheels. If, however, such a feeding drum were to be used for cattle, then it would be necessary to cover up the middle wheel of a structure such as shown in Fig. 2 in order to prevent them from interfering with each other, the distance between the outside wheels being just about right for the use of cattle. Hogs, if not too large, would take about the same space as sheep.

In order not to feed too much molasses from the barrel 8 to the feeding drum 1, the former is, when substantially full, secured in the position shown in solid lines in Fig. 1, but, as the supply in drum 1 is depleted, the barrel 8 is released and rolled into the dotted line position shown in this figure, where it is secured. This places the connection to the hose 11 at the bottom of the barrel 8, as shown in the dotted line position in Fig. 1, and permits the molasses in the barrel and in the drum to seek the same level. Of course, the barrel 8, when moved into this new position, is secured therein in order to prevent the animals from displacing it.

It is obvious that shaft 16 may be either solid or hollow, that the feeding wheels 15 may be made of any desired form or material, and that the surface of these wheels may be either smooth or roughened, as desired.

In the construction shown on sheet 2 of the drawings, parts 1, 3, 6, 8, 9, 10, 13, 14, 15, 16, and 17 are the same or substantially the same as in the construction described above. The sledge runners 2 are replaced by channel irons 25 which serve as a support for the drums. Parts 5, 7, 20, and 21 are replaced by comparable parts 5a, 7a, 20a, and 21a. Although these parts are different in form, they are similar in function to the parts which they replaced.

In this construction, instead of relying upon the teeth or tongue of the animal to cause rotation of the wheel 15, I provide means whereby the wheel may be positively rotated by the head of the animal, as will now be described.

A U-shaped supporting member 26 has its two arms upon opposite sides of the feeding wheel 15 and their ends are apertured for the reception of the shaft 16 which, as stated above, may be either a solid or a tubular shaft. I believe it preferable to use a tubular shaft because of the extra strength for any given weight of material. Passing through the arms near the bent portion of the U-shaped member is a pivot 27, shown in Fig. 7 as a bolt. Upon this bolt is pivoted a pawl or dog 28 which engages the surface of the wheel 15 at nearly a right angle and which has a finger 29 extending laterally therefrom to prevent the dog from swinging past center so that it would fail to function to cause rotation of the wheel. The finger 29 positively prevents such a thing from happening. If it seems desirable, in order to keep the dog 28 centrally positioned between the arms 26, sleeves may surround the bolt 27 between the dog 28 and the arms 26.

A plate 30 having its two ends bent up, as shown in Figs. 5 and 6, is rigidly secured to the bent portion of the U-shaped member so that it may swing about the shaft 16. An eye 31 is secured to the plate 30 in any suitable manner. It is shown in Fig. 6 as having its stem extending therethrough and through the bent portion of the U-shaped member and as having a nut on its lower end to fasten it in place. This is merely illustrative of one way in which this eye may be fastened in place. From this eye extends a chain 32 and this chain passes over the edge of the plate, as shown in Fig. 6, and down to a hook 33 where one of the links of the chain may be attached to the hook. This is in order to furnish adjustment for the plate 30 which may be adjusted to any one of several heights by varying the attachment of the chain 32 to the hook 33. A pawl or dog 21a is mounted on a pivot member 34 which passes through the sides of the cap 20a. This pawl is provided with a finger 29, the same as the pawl 28.

The height of the plate 30 is adjusted according to the kind of animals that are to be fed from the apparatus. When used for feeding cattle, the plate 30 may be adjusted higher than for sheep or hogs. When the animal comes up to the feeding place, he places his head under the plate and lifts up. This causes the pawl 28 to be forced into tight engagement with the wheel 15 and rotates the same forwardly. When the animal lowers its head, the point of pawl 21a engages the surface of the wheel 15 and prevents backward rotation thereof, while the weight of the plate 30 causes it to drop down as far as permitted by the chain 32. The pawl 28 now engages a new place on the wheel, ready to rotate the same forwardly as soon as the plate 30 is again lifted by an animal desiring to lick the molasses from the surface of the wheel. This procedure may be repeated indefinitely.

This disclosure is, in part, a continuation of my prior application, Serial No. 86,619, filed June 22, 1936.

It will of course be understood that the specific description of structure set forth above may be departed from without departing from the spirit of this invention as set forth in this specification and the appended claims.

Having now described my invention, I claim:

1. A liquid molasses stock feeding drum of approximately cylindrical form having opposite approximately parallel ends, said drum having an eccentrically mounted shaft therein extending through the opposite ends, said drum having an opening through its approximately cylindrical wall in the part nearest to the shaft, a cap covering the lower end of the opening in the wall and secured in liquid-tight relation thereto, a cap covering the upper portion of the opening in the drum wall, and a wheel rotatably mounted on said shaft and having its periphery projecting through said opening between said caps, the lower edge of the wheel beink adapted to dip into the molasses in the drum and adapted, when rotated forwardly, to bring the molasses up into feeding position.

2. A liquid molasses stock feeding drum of approximately cylindrical form having opposite approximately parallel ends, said drum having an eccentrically mounted shaft therein extending through the opposite ends, said drum having an opening through its approximately cylindrical wall in the part nearest to the shaft, one end of the opening, when the drum is in use, being higher than the other, a cap covering the upper portion of the opening and having its central part spaced upwardly from the periphery of the drum, a wheel rotatably mounted on said shaft and having its periphery projecting through said opening, the lower edge of the wheel being adapted to dip into the molasses in the drum and adapted, when rotated forwardly, to bring the molasses up into feeding position, and a dog pivotally carried by said cap and extending downwardly into engagement with the wheel to prevent backward rotation thereof.

3. A structure as defined by claim 2 provided with a swingably mounted plate located above the wheel and in a position to be engaged and operated by the head of an animal while feeding at said opening, carrying a pivotally mounted dog to engage the wheel and rotate same forwardly as the plate is pushed forwardly.

4. A structure as defined by claim 2 having a U-shaped member straddling the wheel, with its ends perforated and pivotally mounted upon said shaft to be oscillated forward and backward thereon, an abutment member carried by said U-shaped member above the drum for engagement by the head of an animal, whereby the U-shaped member may be moved forwardly by the animal, and a pawl pivotally carried by the unit comprising the U-shaped member and the abutment member, said pawl projecting into engagement with the wheel to cause rotation thereof when an animal pushes the abutment member forwardly.

5. A liquid molasses stock feeding drum having opposite approximately parallel ends, said drum having an eccentrically but approximately centrally mounted shaft therein extending through said ends, said drum having an opening through a lateral wall at a point nearest to said shaft, a wheel rotatably mounted on said shaft and having a portion of its periphery in proximity to said opening for access by live stock, an abutment member mounted in proximity to said opening and so connected to said shaft as to be rotatable forwardly and backwardly over said opening, means connected to said abutment member so as to oscillate therewith and so as to engage said wheel and cause forward rotation thereof as the abutment member is pushed forwardly, and means connected to said drum and engaging said wheel so as to prevent backward rotation thereof when the abutment member is allowed to move backwardly.

6. In a stock feeder for feeding liquid molasses; a container having opposite approximately parallel ends; an eccentrically but approximately centrally mounted shaft in said container and extending through said ends; said container having an opening in a lateral wall thereof at a point nearest to said shaft; a wheel on said shaft, mounted rotatably, with a portion of its periphery in proximity to said opening for access by live stock; an actuator mounted oscillatably on said shaft and in proximity to said opening; said actuator having a part to engage said wheel to move it forwardly when the actuator moves in one direction and a pass freely thereover when the actuator moves in the opposite direction; holding means connected to the container to prevent backward rotation of the wheel; and means located above said opening and forming a part of said actuator, said means being engageable by the head of an animal to cause forward movement of the actuator whereby to cause rotation of said wheel.

7. A molasses feeder comprising a container having in its upper portion, when in use, an opening, a wheel mounted in the container and having its periphery in proximity to the opening, means positioned to be actuated by an animal while feeding for rotating the wheel in one direction, and means for restraining the wheel from rotation in the opposite direction.

8. A molasses feeder comprising a container having in a portion thereof an opening, a rotatable member mounted therein and having a peripheral surface with a part thereof adjacent said opening, animal operated means for rotating the member in one direction, and means for restraining rotation thereof in the opposite direction.

9. A liquid molasses stock feeding drum having an approximately cylindrical wall and opposite end walls, said drum having a shaft mounted therein substantially parallel to the axis of the cylindrical wall in the upper portion of the drum, said drum having an opening through its approximately cylindrical wall in the upper portion thereof and in the part nearest to the shaft, a rotatable wheel mounted on said shaft and having an upper portion of its periphery in proximity to said opening, the lower portion of the wheel being adapted to dip into molasses in the drum and adapted, when rotated in one direction, to bring the molasses up to said opening, the drum guarding the lower portion of said wheel from contamination by hogs rubbing their bodies thereagainst, and animal actuated means operating in conjunction with the wheel to cause the wheel to rotate in one direction so as to lift molasses from the drum to the opening for access by the stock.

10. A liquid molasses stock feeding drum having an approximately cylindrical wall and opposite end walls, said drum having a shaft mounted therein substantially parallel to the axis of the cylindrical wall in the upper portion of the drum, said drum having an opening through its approximately cylindrical wall in the upper portion thereof in the part nearest to the shaft, a rotatable wheel mounted on said shaft and having an upper portion of its periphery in proximity to said opening, the lower portion of the wheel being adapted to dip into molasses in the drum and adapted, when rotated in one direction, to bring the molasses up to said opening, the drum guarding the lower portion of said wheel from contamination by hogs rubbing their bodies thereagainst and supporting the wheel at such an elevation that hogs cannot rub their bodies against the upper portion thereof, and a dog mounted above the wheel and extending downwardly into engagement therewith to prevent rotation thereof in the opposite direction.

11. In a liquid molasses stock feeding apparatus, the combination of a support, a feeding drum for feeding liquid molasses to live stock, flexible means connected to said support and extending over said drum for securing the feeding drum to the support, a barrel for supplying molasses to the drum, said barrel being secured to the support with its bottom at substantially the same elevation as the bottom of the drum and having hollow flexible means connecting its interior with the interior of the drum so as to permit flow of molasses from the barrel to the drum, said drum having an opening in the upper portion of its curved surface whereby access may be had to molasses contained therein, and a feeding wheel rotatably mounted in said drum and projecting into said opening to lift molasses up to feeding position.

KARL P. TESKE.